US011172466B2

(12) United States Patent
Sun et al.

(10) Patent No.: US 11,172,466 B2
(45) Date of Patent: Nov. 9, 2021

(54) WEARABLE COVERAGE EXTENSION MECHANISMS

(71) Applicant: Apple Inc., Cupertino, CA (US)

(72) Inventors: Haitong Sun, Irvine, CA (US); Dawei Zhang, Saratoga, CA (US); Li Su, San Jose, CA (US); Tarik Tabet, Los Gatos, CA (US); Wei Zeng, San Diego, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/880,572

(22) Filed: May 21, 2020

(65) Prior Publication Data

US 2020/0374834 A1 Nov. 26, 2020

Related U.S. Application Data

(60) Provisional application No. 62/852,956, filed on May 24, 2019.

(51) Int. Cl.
| | |
|---|---|
| *H04W 68/02* | (2009.01) |
| *H04L 5/00* | (2006.01) |
| *H04W 24/02* | (2009.01) |
| *H04B 1/3827* | (2015.01) |
| *H04B 17/318* | (2015.01) |

(52) U.S. Cl.
CPC ............ *H04W 68/02* (2013.01); *H04B 1/385* (2013.01); *H04B 17/318* (2015.01); *H04L 5/0048* (2013.01); *H04W 24/02* (2013.01)

(58) Field of Classification Search
CPC .... H04W 68/02; H04W 24/02; H04B 17/318; H04B 1/385; H04L 5/0048
USPC ........................................................ 455/458
See application file for complete search history.

(56) References Cited

U.S. PATENT DOCUMENTS

| | | | |
|---|---|---|---|
| 8,824,314 B2 | 9/2014 | Ananthanarayanan et al. | |
| 10,411,795 B2 | 9/2019 | Liu et al. | |
| 2004/0192286 A1 | 9/2004 | Longhurst et al. | |
| 2014/0098761 A1* | 4/2014 | Lee ...................... | H04W 24/02 370/329 |
| 2014/0220981 A1 | 8/2014 | Jheng et al. | |
| 2015/0223084 A1* | 8/2015 | Lightstone ............ | H04L 5/0048 370/252 |

(Continued)

*Primary Examiner* — Ted M Wang
(74) *Attorney, Agent, or Firm* — Kowert, Hood, Munyon, Rankin & Goetzel, P.C.

(57) ABSTRACT

Systems, apparatuses, and methods for coverage improvements in wireless communication devices. A wireless communication device may be configured to selectively receive one of a plurality of paging signals, or a portion thereof, based on measured or expected coverage quality of communications from a base station. In some scenarios, the wireless communication device may provide an indication to the base station of which paging signal the wireless communication device will attempt to receive, such that the base station may include paging information directed to that UE only in the indicated paging signal. In some scenarios, the base station may include paging information directed to that UE in a plurality of paging signals, each of the paging signals including a different number of repetitions of the paging information. In some scenarios, the UE may receive only a portion of a paging signal including a plurality of repetitions of the paging information.

20 Claims, 12 Drawing Sheets

(56) References Cited

U.S. PATENT DOCUMENTS

| | | | |
|---|---|---|---|
| 2018/0063881 A1* | 3/2018 | Shah | H04L 5/0048 |
| 2018/0242277 A1* | 8/2018 | Liu | H04W 16/14 |
| 2018/0368098 A1* | 12/2018 | Gopal | H04W 76/15 |
| 2020/0022041 A1 | 1/2020 | Ly et al. | |
| 2020/0367234 A1 | 11/2020 | Bergstrom et al. | |

* cited by examiner

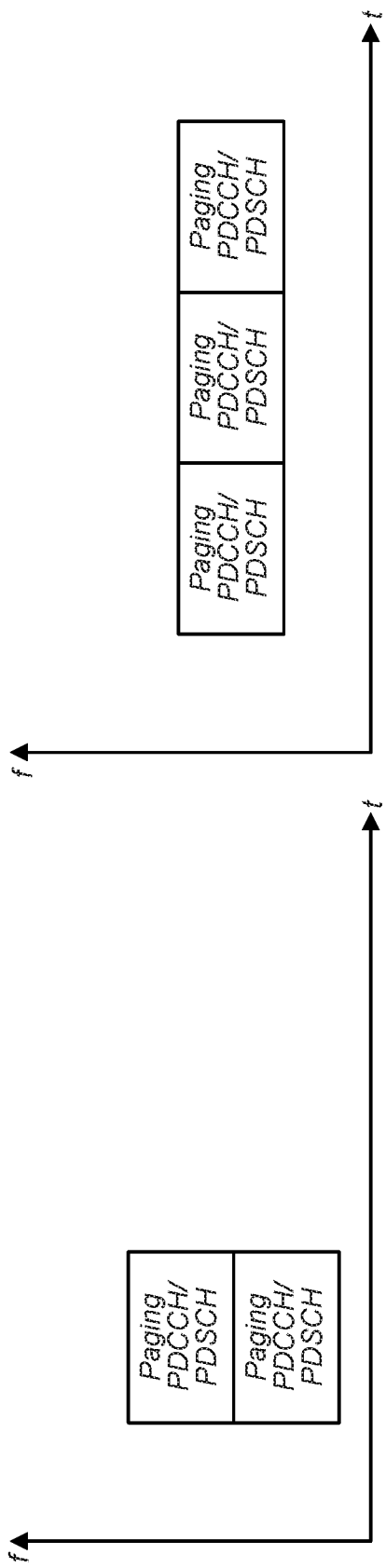
FIG. 5A
FIG. 5B
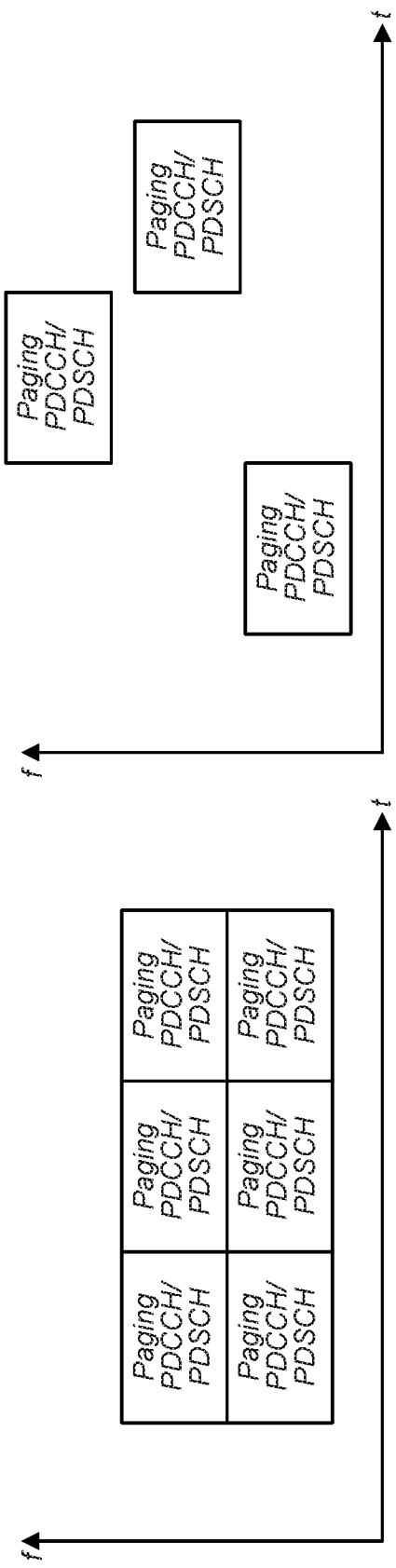
FIG. 5C
FIG. 5D

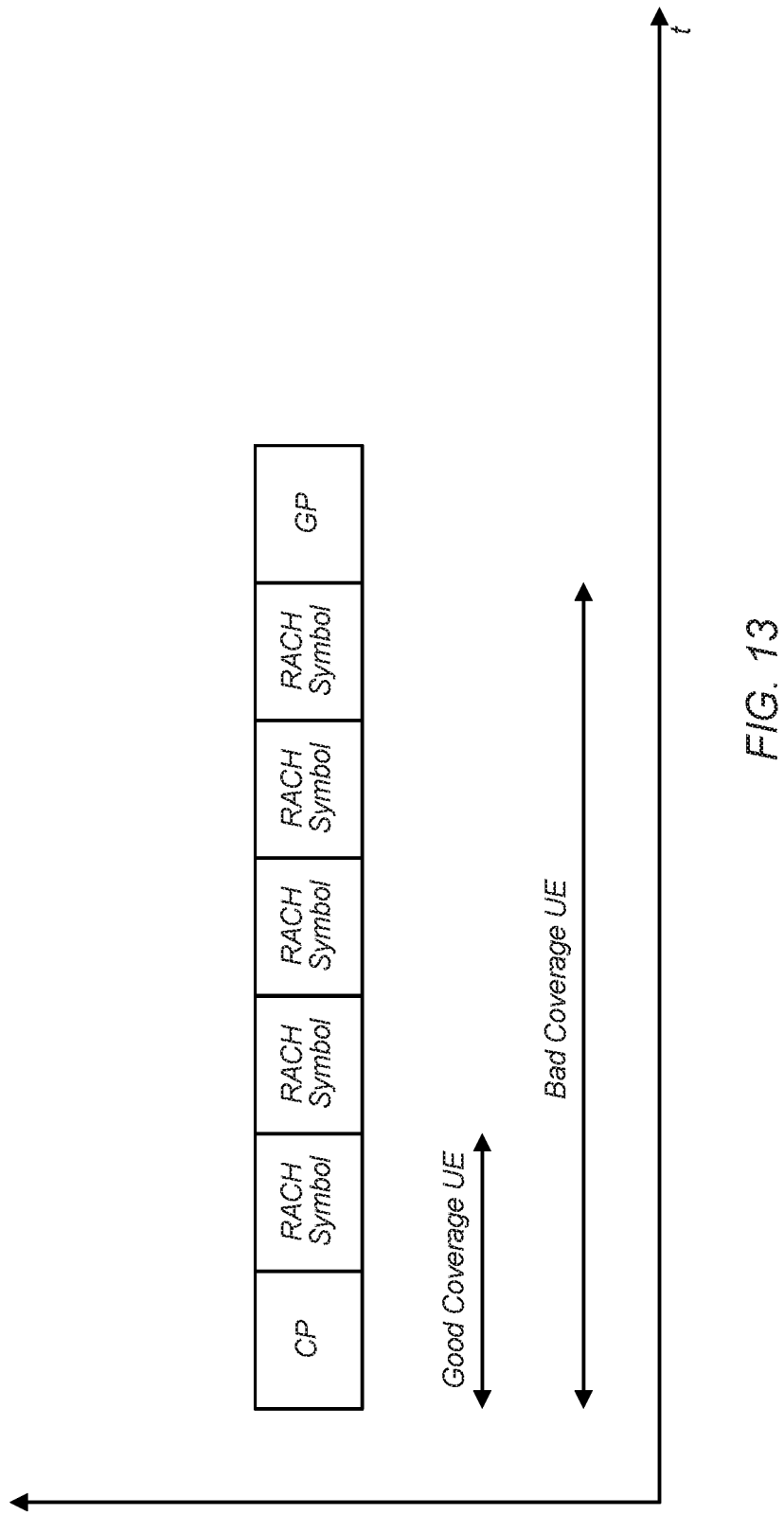

WEARABLE COVERAGE EXTENSION MECHANISMS

PRIORITY CLAIM

This application claims benefit of priority of U.S. provisional application Ser. No. 62/852,956, titled "Wearable Coverage Extension Mechanisms", filed May 24, 2019, whose inventors are Haitong Sun et al., which is hereby incorporated by reference in its entirety as though fully and completely set forth herein.

TECHNICAL FIELD

The present application relates to wireless communication, including to techniques for a link budget limited wireless device to achieve improved communication coverage.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and less battery power than larger portable devices, such as smart phones and tablets, e.g., due to physical size limitations placed on antennas, batteries, etc. In general, it would be desirable to improve wireless communication coverage of communication devices, while minimizing any negative impact on power consumption. Therefore, improvements in the field are desired.

SUMMARY

Embodiments are presented herein of, inter alia, systems, apparatuses, and methods for a wireless device to provide extended coverage for wireless communications.

A wireless communication device is disclosed. The wireless communication device may include a wireless communication receiver; a memory storing software instructions; and a processor coupled to the wireless communication receiver and the memory, the processor configured to implement the software instructions. Implementing the software instructions causes the wireless communication device to determine whether a reception performance metric meets a predetermined threshold. In response to determining that the reception performance metric meets the threshold, the software instructions may cause the wireless communication device to monitor a first frequency range to receive a first paging signal including a single copy of paging information. In response to determining that the coverage reception performance metric does not meet the threshold, the software instructions may cause the wireless communication device to monitor a second, non-overlapping frequency range to receive a second paging signal including a plurality of copies of the paging information.

In some scenarios, both the first paging signal and the second paging signal may include paging information directed to the wireless communication device.

In some scenarios, implementing the software instructions may further cause the wireless communication device to transmit to a base station an indication of whether the wireless communication device will monitor the first frequency range or the second frequency range, wherein, based on the indication, only one of the first paging signal or the second paging signal includes paging information directed to the wireless communication device. In some scenarios, implementing the software instructions further causes the wireless communication device to, after transmitting the indication, determine a change in the reception performance metric; and in response to determining the change in the reception performance metric, transmit to the base station an updated indication of whether the wireless communication device will monitor the first frequency range or the second frequency range.

In some scenarios, the plurality of copies of the paging information in the second paging signal may be arranged in the time domain, wherein the first frequency range and the second frequency range have substantially the same bandwidth.

In some scenarios, the plurality of copies of the paging information in the second paging signal may be interleaved.

In some scenarios, the reception performance metric may include coverage quality of wireless communication signals received by the wireless communication receiver.

In some scenarios, the reception performance metric may include a distance of the wireless communication device from a base station.

In some scenarios, the wireless communication device may be a link budget limited device.

Also disclosed are methods including steps similar to those outlined above.

Also disclosed are baseband processing apparatuses for implementing steps similar to those outlined above.

Also disclosed are non-transitory computer-readable memory media storing software instructions to cause a wireless communication device to behave substantially as outlined above.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 5A-5D illustrate various configurations for paging signals for use in increasing paging signal coverage, according to some embodiments;

FIG. 13 illustrates an example RACH signal for use in selectively increasing signal coverage for a wireless device by selectively transmitting a determined number of RACH symbols within the signal, according to some embodiments.

Figure 1:
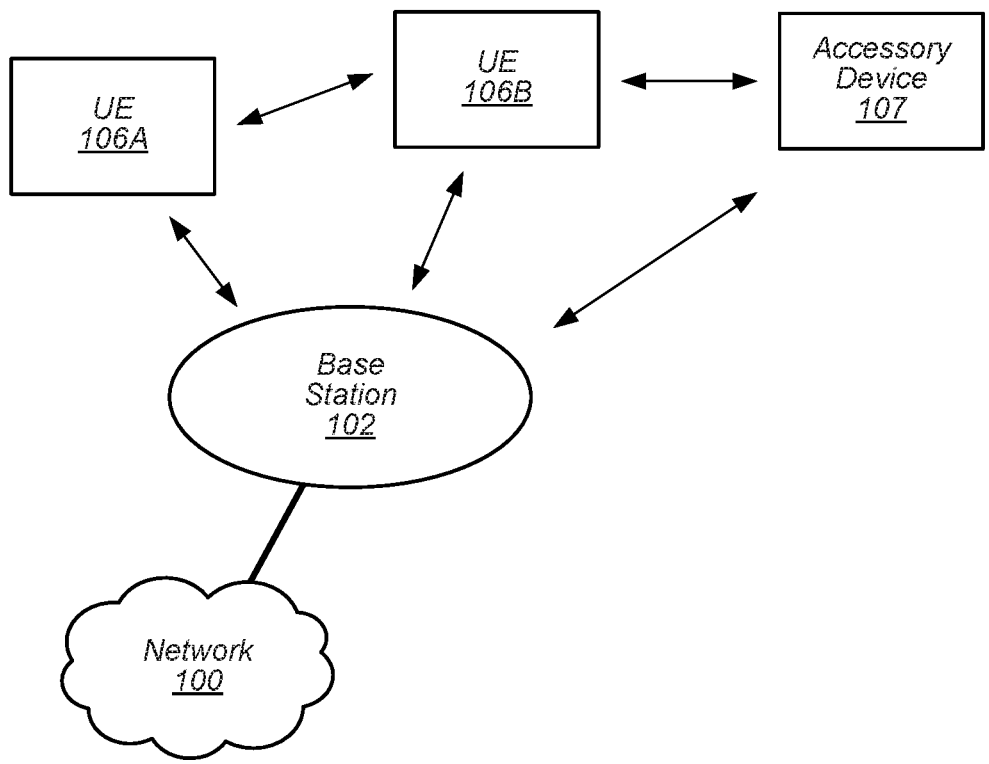
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present Patent Applications:
API: Application programming interface
BS: Base Station
CP: Cyclic Prefix
eNB: eNodeB (Base Station)
EPC: Evolved Packet Core
EPS: Evolved Packet-Switched System
E-UTRAN: Evolved UMTS Terrestrial RAN
gNB: gNodeB (Base Station)
GP: Guard Period
LTE: Long Term Evolution
NR: New Radio
QoE: Quality of Experience
QoS: Quality of Service
PDCCH: Physical Downlink Control Channel
PDSCH: Physical Downlink Shared Channel
RACH: Random Access Channel
RAN: Radio Access Network
RAT: Radio Access Technology
UE: User Equipment
UMTS: Universal Mobile Telecommunications System
3GPP: Third Generation Partnership Project Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over a cellular RAT (e.g., LTE, LTE-A, NR) with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over a particular cellular RAT, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
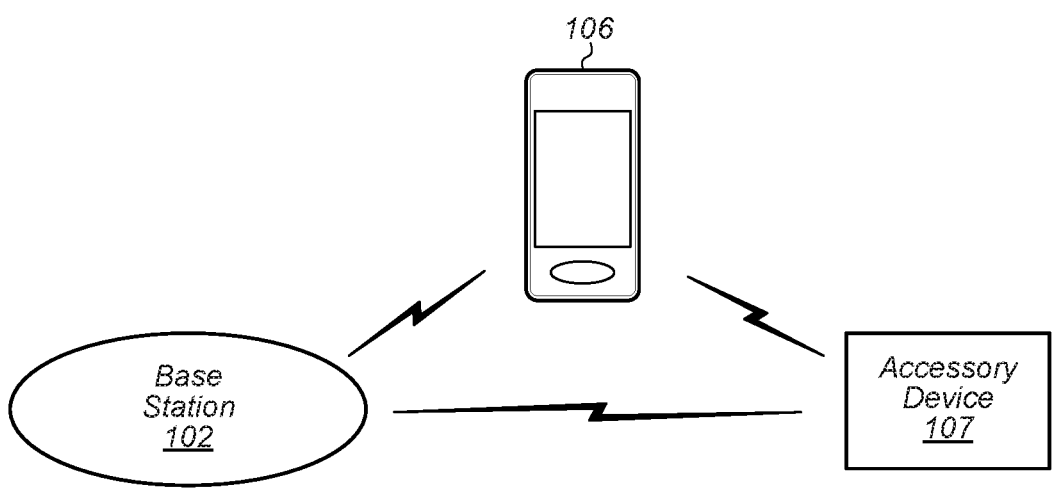
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, such as a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth, Wi-Fi, or ultra-wideband (UWB).

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, the UE 106A and UE 106B may be capable of arranging and performing D2D communication (e.g., including D2D discovery communications) with each other even when out-of-coverage of the BS 102 and other cellular base stations.

The accessory device 107 includes cellular communication capability and hence is able to directly communicate with cellular base station 102 via a cellular RAT. However, since the accessory device 107 is possibly one or more of communication, output power, and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the RATs supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106, which may include establishing a communication channel and/or a trusted communication relationship with the UE 106. Under some circumstances, the accessory device 107 may use the cellular functionality of this proxy device for communicating cellular voice and/or data with the base station 102. In other words, the accessory device 107 may provide voice and/or data packets intended for the base station 102 over the short range link to the UE 106, and the UE 106 may use its cellular functionality to transmit (or relay) this voice and/or data to the base station on behalf of the accessory device 107. Similarly, the voice and/or data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (e.g., processor elements) and various hardware components as described herein. The UE 106 and/or 107 (e.g., using associated processors) may perform any of the method embodiments described herein by executing instructions on one or more processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies (e.g., including any combination of CDMA, GSM, UMTS, LTE, 5G NR, and/or Wi-Fi, among others). In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad™, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities. Hence, in some embodiments, the accessory device may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

In some embodiments, the UE 106 and/or UE 107 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 (and/or 107) and/or BS 102 may be configured to apply different "weight" to different antennas. The process of applying these different weights may be referred to as "precoding".

In some embodiments, the UE 106 and/or UE 107 may include separate transmit and/or receive chains (e.g., including separate antennas and other radio components) for each wireless communication protocol with which it is configured to communicate. As a further possibility, the UE 106 and/or UE 107 may include one or more radios which are shared between multiple wireless communication protocols, and one or more radios which are used exclusively by a single wireless communication protocol. For example, the UE 106 and/or UE 107 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
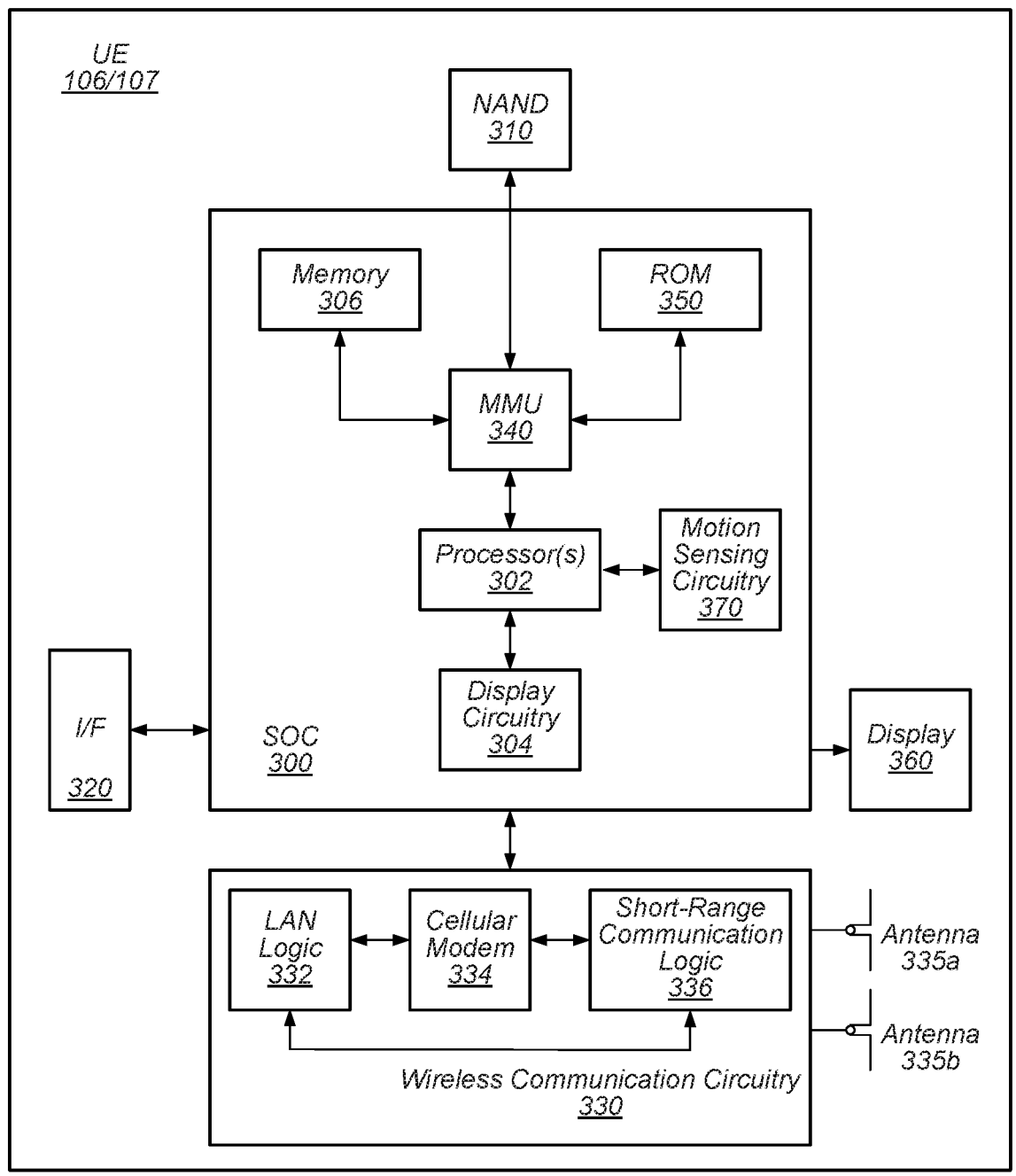
FIG. 3 is a block diagram illustrating an example wireless device, according to some embodiments.

FIG. 3—Example Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface (I/F) 320 (e.g., for coupling to a computer system, dock, charging station, etc.), the display 360, and wireless communication circuitry 330 (e.g., for LTE, LTE-A, NR, CDMA2000, Bluetooth, Wi-Fi, UWB, NFC, GPS, etc.).

The UE device 106/107 may include at least one antenna, and in some embodiments, multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include LAN Logic 332, a Cellular Modem 334, and Short-Range Communication Logic 336. The LAN Logic 332 is for enabling the UE device 106/107 to perform LAN communications, such as Wi-Fi communications on an 802.11 network, or other WLAN communications. The Short-Range Communication Logic 336 is for enabling the UE device 106/107 to perform communications according to a short-range RAT, such as Bluetooth or UWB communications. In some scenarios, the cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., LAN logic 332, cellular modem 334, short-range communication logic 336) of the UE device 106/107 may be configured to implement part or all of the methods described herein, to extend wireless communication coverage, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
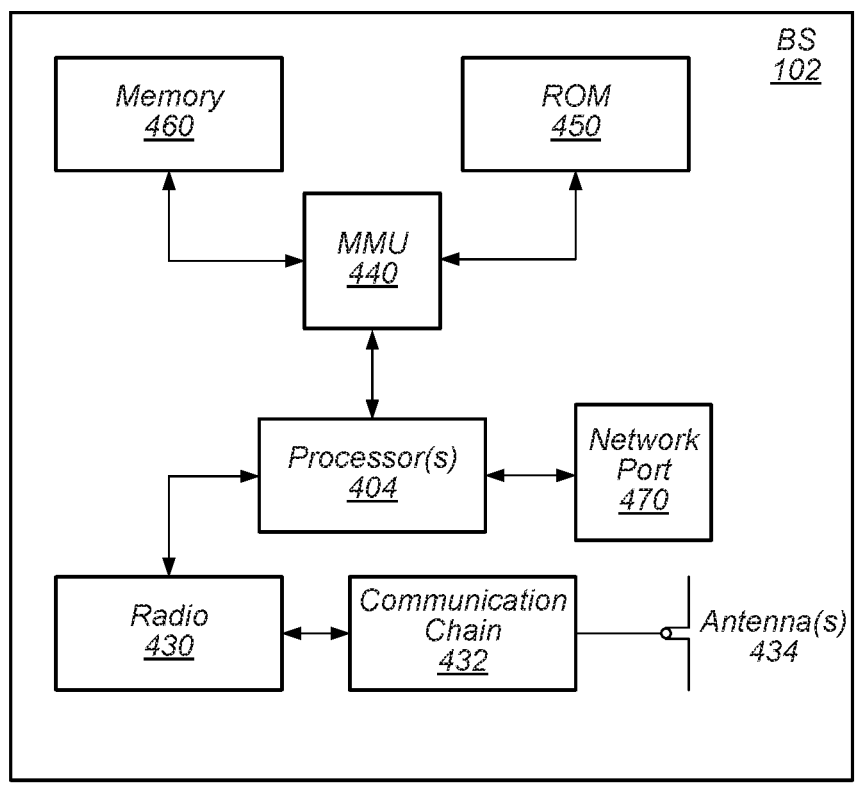
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one radio 430, which may be configured to operate as a wireless transceiver, and may be configured to communicate with UE devices 106/107 via one or more antenna(s) 434. The radio 430 may be configured to communicate via various wireless communication standards, including, but not limited to, LTE, LTE-A, NR, GSM, UMTS, CDMA2000, Wi-Fi, etc. The antenna(s) 434 communicates with the radio 430 via communication chain 432. Communication chain 432 may be a receive chain, a transmit chain or both.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include a NR radio for performing communication according to NR as well as a Wi-Fi radio for performing communication according to Wi-Fi. In such a case, the base station 102 may be capable of operating as both a NR base station and a Wi-Fi access point. As another possibility, the base station 102 may include a multi-mode radio which is capable of performing communications according to any of multiple wireless communication technologies (e.g., any combination of CDMA, GSM, UMTS, LTE, 5G NR, and/or Wi-Fi, among others).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

FIG. 5—Expanding Paging Coverage by Duplicating Paging Information

Traditionally, wireless communication networks, such as cellular communication networks, have been configured or optimized primarily for traditional telecommunication devices, such as smartphones. Further, new communications standards often prioritize high-performance communications over power efficiency or other constraints associated with link budget limited devices. For example, 5G NR (e.g., as defined by 3GPP Rel. 15) is mainly focused on enhanced mobile broadband (eMBB) devices and ultra-reliable low-latency communication (URLLC) devices.

However, some link budget limited devices, such as some wearable devices, may be disadvantaged in such systems. For example, some link budget limited devices may be limited, e.g., in number or size of antennas, and/or other characteristics, e.g., because of a small form factor, such that the link budget limited device may exhibit reduced antenna gain relative to a typical wireless telephone (e.g., approximately 10-15 dB lower gain). Therefore, it may be desirable to provide additional signal coverage for some types of wireless devices.

However, link budget limited devices may also be limited in battery power, e.g., because of a small form factor. Due to these power-saving concerns, some link budget limited devices may remain in a low-power state, such as IDLE or INACTIVE states for the majority of time. In such modes, power consumption may be dominated by paging decoding and measurement. For example, in various 3GPP systems, a UE in IDLE mode may regularly perform measurement of the camping cell, to determine whether to perform cell reselection. The wireless device may also periodically listen for paging signals. For example, in various 3GPP systems, a UE in IDLE mode may periodically listen for a physical downlink control channel (PDCCH). Upon receiving a PDCCH, the UE may recognize that a paging signal is being received, and may proceed to decode at least a portion of the physical downlink shared channel (PDSCH) of the paging signal, to determine whether it includes the UE ID for the receiving UE. If the UE ID is included in the PDSCH, then the UE is considered paged, and the UE may proceed to decode further portions of the PDCCH and/or the PDSCH.

Because some link budget limited devices remain primarily in a low-power state, and further because paging represents a significant portion of the signaling performed in such states, it may be advantageous to focus coverage enhancement approaches on paging.

FIGS. 5A-5D illustrate various options for increasing paging signal coverage by repeating paging information, such as by repeating paging PDCCH and/or PDSCH, according to some embodiments. Repeating the paging information as illustrated in any of FIGS. 5A-5D may increase coverage by increasing the power radiated by the base station in transmitting the paging information. For example, the paging information may be repeated in the frequency domain, e.g., as illustrated in FIG. 5A. This may offer an advantage of spreading the paging information over a larger frequency range, which may allow improved reception if reception is poor across a portion of the frequency range. However, repeating the paging information in the frequency domain may introduce additional power costs. For example, if the paging information is doubled in the frequency domain, then the wireless device must monitor a frequency range that is twice as wide in order to receive the full transmission. Increasing the frequency range monitored by the wireless device may cause the wireless device to sample the signal at a higher rate, utilize additional signal amplifiers, and/or make other changes that increase power consumption.

As another example, the paging information may be repeated in the time domain, e.g., as illustrated in FIG. 5B. This may offer an advantage of spreading the paging information over a longer time range, which may allow improved reception if reception is poor across a portion of the time range, e.g., if there is short-term interference. Additionally, no increase in frequency ranged is needed. However, repeating the paging information in the time domain may also introduce additional power costs. For example, a wireless device operating in an IDLE mode may wake from a low-power state long enough to receive and process the paging information, and then may return to the low-power state. Thus, increasing the time during which the paging information is being received and processed may cause the wireless device to remain in an active state for the increased time, which may increase power consumption.

As another example, the paging information may be repeated in both the frequency domain and the time domain, e.g., as illustrated in FIG. 5C. This may be advantageous, as a compromise between the advantages and disadvantages discussed with regard to FIGS. 5A and 5B. For example, as illustrated in FIG. 5C, the paging information may be duplicated six times, while increasing the frequency range by only two times, and increasing the time range by only three times.

As another example, the paging information may be repeated in the time domain, while also utilizing frequency hopping, e.g., as illustrated in FIG. 5D, to increase frequency diversity. This may offer the same or similar advantages and disadvantages as those discussed with regard to FIG. 5B. Additionally, this example may offer a further advantage of spreading the paging information over a larger frequency range, as discussed with regard to FIG. 5A, but without requiring an increase of the width of the frequency range monitored at any given time.

Figure 6:
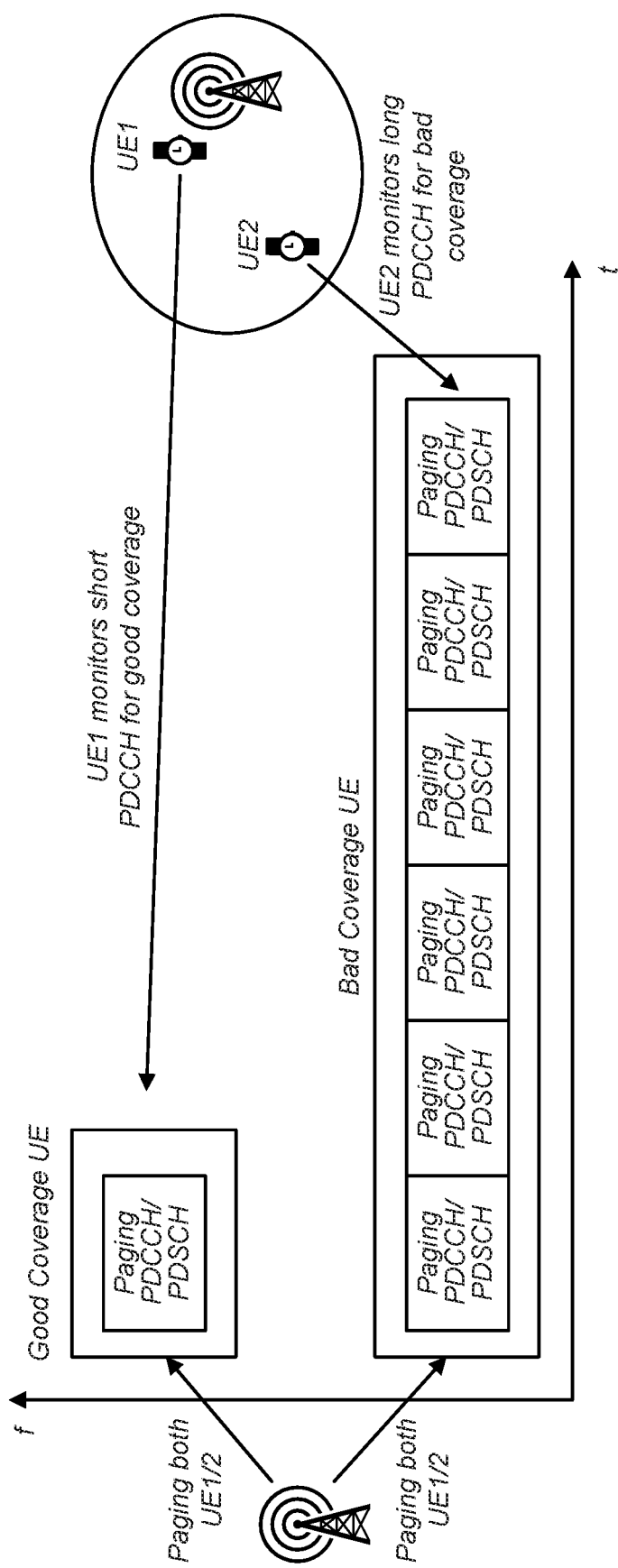
FIG. 6 illustrates an example procedure for selectively increasing signal coverage for a wireless device, by selectively monitoring for a preferred paging signal, according to some embodiments.

FIG. 6—Selectively Monitoring for a Preferred Paging Signal

As noted above, some link budget limited devices, such as some wearable devices, may be limited in terms of batter power. Thus, increasing signal coverage, e.g., by duplicating paging information, may not be desirable if it results in a significant increase in power consumption by the wireless device. Thus, a desirable approach may include selectively increasing signal coverage for a wireless device, e.g., only when additional coverage is needed, while maintaining a lower level of signal coverage, to reduce power consumption, when the lower level of signal coverage is sufficient.

FIG. 6 illustrates an example procedure for selectively increasing signal coverage for a wireless device, by selectively monitoring for a preferred paging signal, according to some embodiments. As illustrated in FIG. 6, a wireless device, such as the UE 106/107, may be located at any of various coverage areas within a cell. For example, UE1 is illustrated as being located close to the base station, which should result in good coverage (e.g., high signal strength, high signal-to-noise ratio, etc.), while UE2 is illustrated as being located close to the cell edge, which may result in poor coverage (e.g., low signal strength, low signal-to-noise ratio, etc.). Specifically, UE1 may receive a paging signal clearly, while UE2 may experience greater signal loss during reception. As a result, UE1 may be capable of receiving paging signals with less repetition than UE2.

To accommodate both UE1 and UE2, the base station may transmit two distinct versions of the paging signal. For example, a first paging signal may include a single copy of the paging information; e.g., a single copy of the PDCCH and PDSCH. A second paging signal may include a plurality of copies of the paging information. In some scenarios, the copies of the paging information may be interleaved. Each of the first paging signal and the second paging signal may include paging information for each of UE1 and UE2, such that either UE may obtain applicable paging information by receiving either paging signal.

As illustrated in FIG. 6, the second paging signal may be formed by duplicating the paging information in the time domain, to increase the total power of the signal. In such scenarios, the first paging signal may be transmitted on a first frequency range, and the second paging signal may be transmitted on a second, non-overlapping frequency range (e.g., having substantially the same bandwidth as the first frequency range), e.g., simultaneously or concurrently. Thus, a UE experiencing good coverage, such as UE1, may monitor the first frequency range to receive the first paging signal, while a UE experiencing poor coverage, such as UE2, may monitor the second frequency range to receive the second paging signal. Because the second paging signal includes greater repetition, a UE experiencing poor coverage may increase the probability of properly receiving and decoding the paging information by choosing to receive the second paging signal, which may lead to increased efficiency and performance. However, because the first paging signal is much shorter in time than the second paging signal, a UE experiencing good coverage may conserve power by choosing to receive the first paging signal, as the redundancy of the second paging signal may not be necessary/beneficial.

In other implementations, the second paging signal may be formed by duplicating the paging information in the frequency domain. In such scenarios, the first paging signal may be transmitted during a first time window, and the second paging signal may be transmitted during a second, non-overlapping time window, e.g., wherein the frequency range of the second paging signal may include the frequency range of the first signal. Thus, a UE experiencing good coverage, such as UE1, may monitor the frequency range of the first signal during the first time window to receive the first paging signal, while a UE experiencing poor coverage, such as UE2, may monitor the frequency range of the second signal during the second time window to receive the second paging signal. Because the first paging signal has a much smaller frequency range, a UE experiencing good coverage may conserve power by choosing to receive the first paging signal, and monitoring only that smaller frequency range, as opposed to monitoring the larger frequency range of the second paging signal.

A UE may use any of various methods to determine which paging signal to receive, e.g., based on expected and/or measured performance metrics. For example, the UE may determine whether a quality level of the signal coverage of one or more wireless communication signals (e.g., paging signals) received from the base station meets a predetermined threshold. E.g., the UE may determine whether one or more specific signal quality metrics (e.g., RSSI, RSRP, RSRQ, RSCP, SINR, error rate) meets the threshold. If the UE determines that the coverage quality meets the threshold (e.g., indicating that signal quality is sufficiently strong), then the UE may monitor for the first paging signal. If the UE determines that the coverage quality does not meet the threshold (e.g., indicating that signal quality is weak), then the UE may monitor for the second paging signal.

As another example, the UE may determine its location relative to the base station, e.g., using a GPS radio, time-of-flight calculation, or any other location mechanism. E.g., the UE may determine whether it is located within a threshold distance from the base station. If the UE determines that it is within the threshold distance from the base station (e.g., indicating that signal quality is likely to be strong), then the UE may monitor for the first paging signal. If the UE determines that it is located outside the threshold distance from the base station (e.g., indicating that signal quality is likely to be weak), then the UE may monitor for the second paging signal.

As another example, the UE may compare its location to a list of locations for which past performance is known. For example, if the UE determines (e.g., based on GPS data, presence of known Wi-Fi networks, etc.) that it is currently located at or near a point at which coverage or reception performance has been consistently good in the past, then the UE may monitor for the first paging signal. If the UE determines that it is currently located at or near a point at which coverage or reception performance has consistently been poor in the past, then the UE may monitor for the second paging signal.

Figure 7:
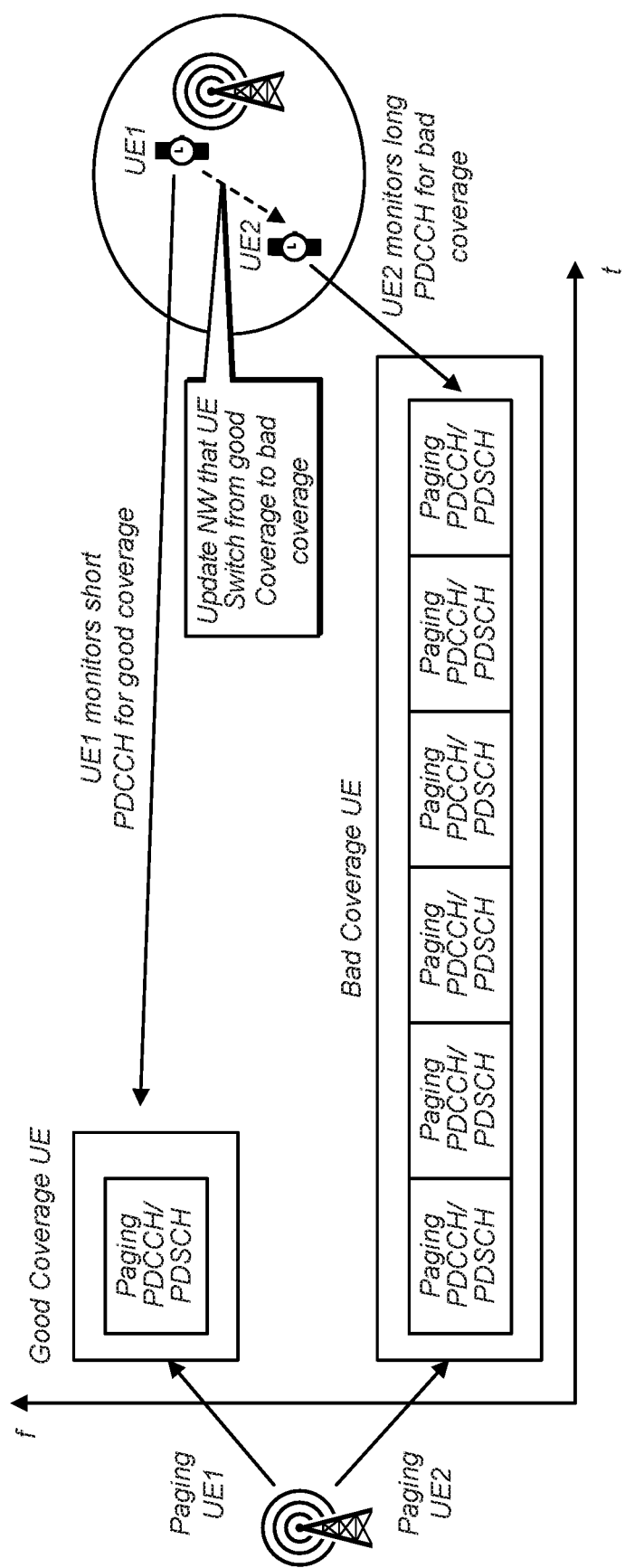
FIG. 7 illustrates an example procedure for selectively increasing signal coverage for a wireless device, by selectively transmitting a preferred paging signal, according to some embodiments.

FIG. 7—Selectively Transmitting a Preferred Paging Signal

FIG. 7 illustrates an example procedure for selectively increasing signal coverage for a wireless device, by selectively transmitting a preferred paging signal, according to some embodiments. As illustrated in FIG. 7, a wireless device, such as the UE 106/107, may be located at any of various coverage areas within a cell. For example, UE1 is illustrated as being located close to the base station, which should result in good coverage, while UE2 is illustrated as being located close to the cell edge, which may result in poor coverage, just as in FIG. 6. Specifically, UE1 may receive a paging signal clearly, while UE2 may experience greater signal loss during reception. As a result, UE1 may be capable of receiving paging signals with less repetition than UE2.

In the implementation of FIG. 7, the base station may selectively transmit paging information for a given UE in one of a first paging signal or a second paging signal. For example, the first paging signal may include a single copy of the paging information; e.g., a single copy of the PDCCH and PDSCH. The second paging signal may include a plurality of copies of the paging information. In some scenarios, the copies of the paging information may be interleaved. The second paging signal may include paging information duplicated in either the time domain or the frequency domain, e.g., as discussed above with regard to FIG. 6.

To assist the base station in selecting whether to transmit paging information for a given UE in the first paging signal or the second paging signal, each UE may provide (e.g., transmit) to the base station an indication of whether the UE will monitor for the first paging signal or the second paging signal. In response, the base station may provide paging information for that UE in the indicated paging signal. In some scenarios, the base station may transmit only the indicated paging signal, while foregoing transmission of the non-indicated paging signal. In other scenarios, the base station may transmit both the indicated paging signal (e.g., containing paging information for at least the indicating UE), and the non-indicated paging signal (e.g., containing paging information for one or more other UEs, which may have indicated that they would monitor for that paging signal).

The UE may use any of various methods to determine which paging signal to receive, e.g., according to any of the methods discussed above with regard to FIG. 6. For example, the UE may determine whether a quality level of the signal coverage of one or more wireless communication signals received from the base station meets a predetermined threshold. In response to determining that the coverage quality meets the threshold, the UE may monitor for the first paging signal. In response to determining that the coverage quality does not meet the threshold, the UE may monitor for the second paging signal. In some scenarios, the UE may also provide the indication of whether the UE will monitor for the first paging signal or the second paging signal in response to the determination, or in response to a change in the determination. For example, the UE may provide an indication to the base station that the UE will monitor for the second paging signal in response to determining that the coverage quality stops meeting the predetermined threshold (e.g., when signal strength or other signal quality metric drops below a threshold value, or when the UE moves beyond a threshold distance from the base station). Similarly, the UE may provide an indication to the base station that the UE will monitor for the first paging signal in response to determining that the coverage quality begins meeting the predetermined threshold.

A UE may indicate to the base station whether the UE will monitor for the first paging signal or the second paging signal in any of various forms. For example, the UE may, in some scenarios, provide an express indication, such as a bit flag, of which paging signal it will monitor. As another example, the UE may communicate to the base station a flag indicating whether the quality level of the signal coverage meets the predetermined threshold, which the base station may interpret as an indication of which paging signal the UE will monitor for. As another example, the UE may communicate to the base station any of the information used by the UE to determine whether the quality level of the signal coverage meets the predetermined threshold (e.g., signal quality metrics, location data, etc.). This information may allow the base station to independently determine whether the quality level of the signal coverage meets the predetermined threshold, and may therefore serve as an indication of whether the UE will monitor for the first paging signal or the second paging signal.

As illustrated in FIG. 7, UE1, which is located close to the base station, determines that coverage quality meets the predetermined threshold. UE1 provides to the base station an indication that UE1 will monitor for the first paging signal. UE1 monitors for the first paging signal, to receive the paging information directed to UE1. UE2, which is located far from the base station (e.g., close to the cell edge), determines that coverage quality does not meet the predetermined threshold. UE2 provides to the base station an indication that UE2 will monitor for the second paging signal. UE2 monitors for the second paging signal, to receive the paging information directed to UE2. In response to the indications, the base station transmits the first paging signal including paging information directed to UE1, and the second paging signal including paging information directed to UE2.

If UE1 moves to the location of UE2 (or if the coverage quality sufficiently decreases for other reasons), then UE1 may update the network by providing to the base station a new indication that UE1 will monitor for the second paging signal. Similarly, if UE2 moves to the location of UE1 (or if the coverage quality sufficiently increases for other reasons), then UE2 may update the network by providing to the base station a new indication that UE2 will monitor for the first paging signal.

The scenario of FIG. 7 may offer certain advantages and disadvantages relative to the scenario of FIG. 6. For example, in the scenario of FIG. 6, the base station transmits paging information for each UE in both the first paging signal and the second paging signal, while the scenario of FIG. 7 reduces the amount of paging data transmitted by including paging data for a given UE in only one of the first paging signal or the second paging signal. However, the scenario of FIG. 7 may include additional signaling in the form of each UE providing the indication of whether the UE will monitor for the first paging signal or the second paging signal.

In some scenarios, a hybrid approach may be used, in which the base station may include paging information for a given UE in only one of the first paging signal or the second paging signal in response to receiving an indication that the UE will monitor for one of the first paging signal or the second paging signal. However, if the base station does not receive an indication from the UE, the base station may include paging information for the UE in both the first paging signal and the second paging signal.

Figure 8:
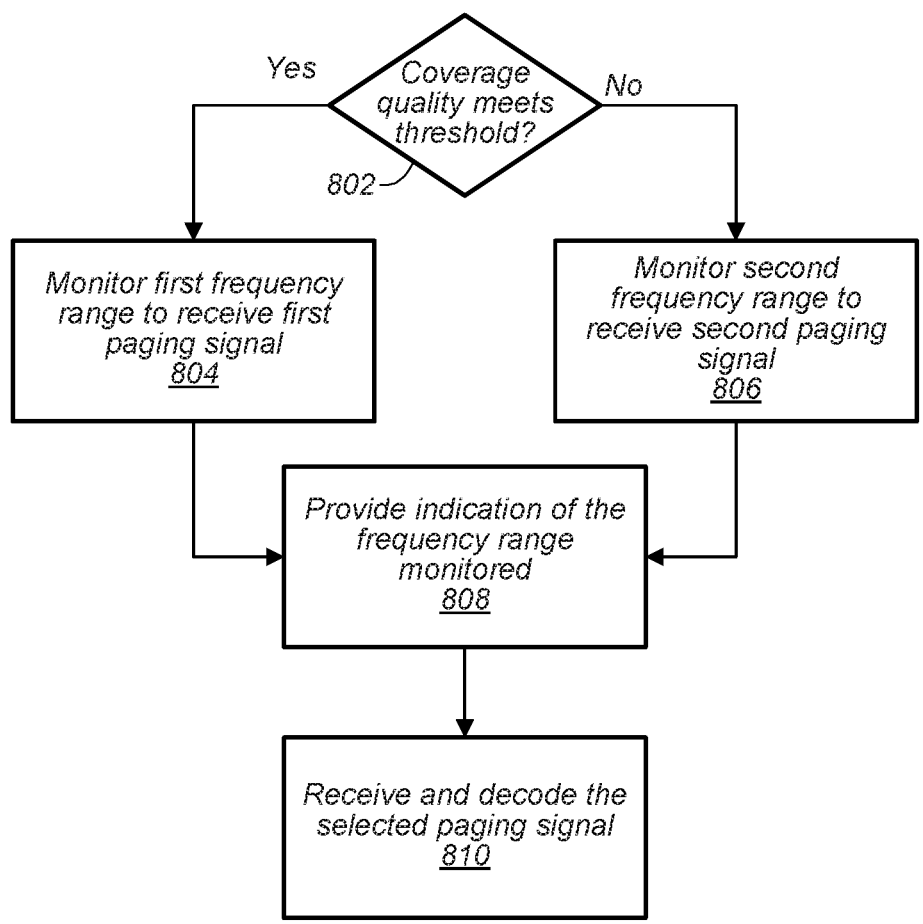
FIG. 8 illustrates a flowchart diagram of an example method for selectively obtaining a preferred paging signal, according to some embodiments.

FIG. 8—Selectively Obtaining a Preferred Paging Signal

FIG. 8 illustrates a flowchart diagram of an example method for selectively obtaining a preferred paging signal, according to some embodiments, consistent with the scenarios of FIG. 6 and/or FIG. 7. The procedure of FIG. 8 may be performed by a wireless communication device, such as the UE 106/107, or by a component thereof, such as by the wireless communication circuitry 330 or the cellular modem 334, or more generally in conjunction with any of the circuitry, systems, devices, elements, or components shown in the Figures or described herein, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that, while at least some elements of the method are described in a manner relating to the use of communication techniques and/or features associated with 3GPP specification documents, such description is not intended to be limiting to the disclosure, and aspects of the method may be used in any suitable wireless communication system, as desired.

At 802, the wireless communication device may determine whether coverage quality of wireless communication signals received by the wireless communication device (e.g., by a wireless communication receiver of the wireless communication device) meets a predetermined threshold. This determining may be performed according to any of the methods described above with regard to FIG. 6 or FIG. 7.

In response to determining that the coverage quality meets the threshold, the wireless communication device may, at 804, monitor a first frequency range to receive a first paging signal. The first paging signal may include a single copy of paging information.

In response to determining that the coverage quality does not meet the threshold, the wireless communication device may, at 806, monitor a second frequency range to receive a second paging signal. The second frequency range may be non-overlapping with regard to the first frequency range. The second paging signal may include a plurality of copies of the paging information.

In some scenarios, the wireless communication device may, at 808, transmit to a base station, such as the base station 102, an indication of whether the wireless communication device will monitor the first frequency range or the second frequency range. Based on this indication, the base station may include paging information directed to the wireless communication device in only one of the first paging signal or the second paging signal.

In other scenarios, 808 may be omitted. In such scenarios, the base station may include paging information directed to the wireless communication device in both the first paging signal and the second paging signal.

Based on the monitoring of either the first frequency range or the second frequency range, the UE may, at 810, receive the corresponding paging signal. Upon receipt of the paging signal, the UE may decode the paging signal and take appropriate action in response to the paging.

Figure 9:
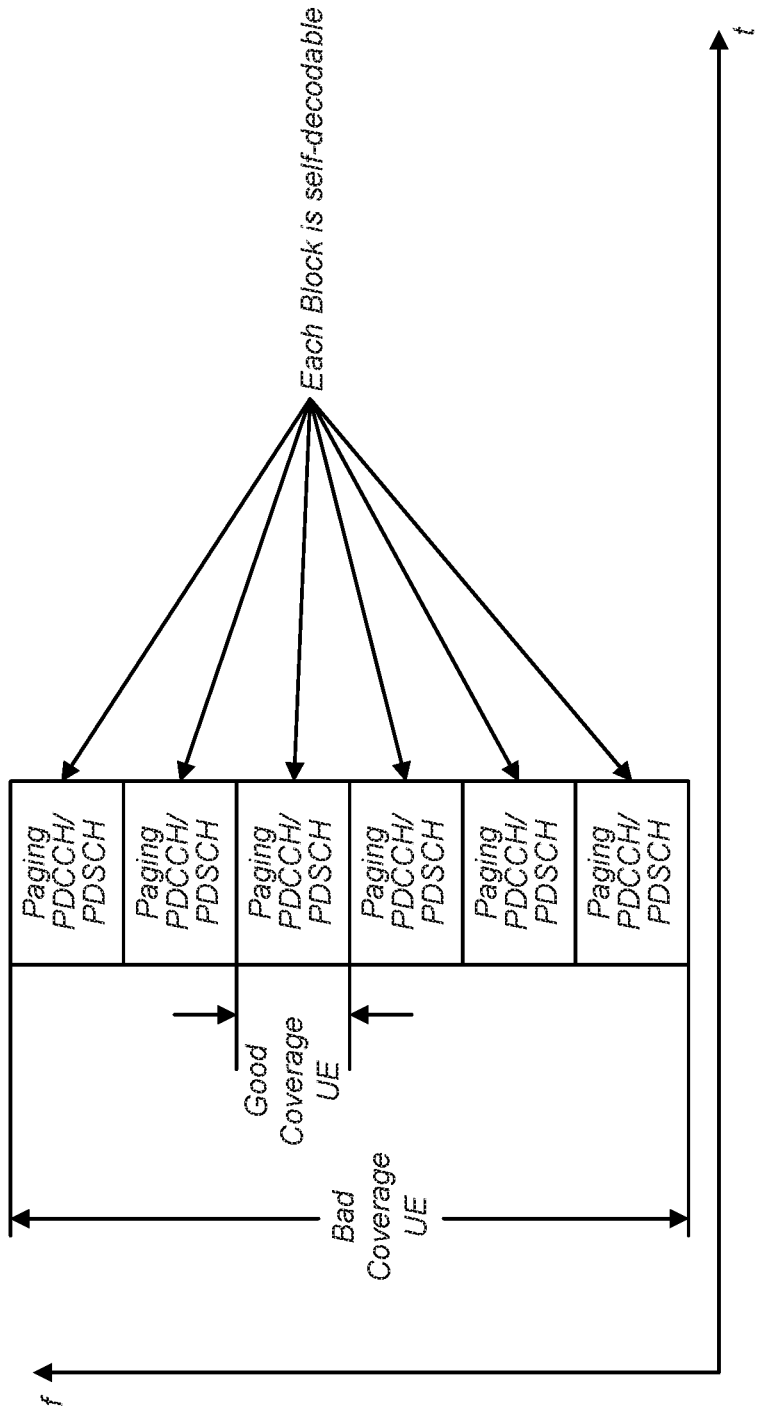
FIG. 9 illustrates an example paging signal for use in selectively increasing signal coverage for a wireless device by selectively receiving a determined number of paging blocks arranged in the frequency domain, according to some embodiments.

FIG. 9—Selectively Receiving a Determined Number of Paging Blocks in the Frequency Domain FIG. 9 illustrates an example paging signal for use in selectively increasing signal coverage for a wireless device by selectively receiving a determined number of paging blocks arranged in the frequency domain, according to some embodiments. The paging signal of FIG. 9 may be transmitted by a base station such as the base station 102.

Specifically, FIG. 9 illustrates a paging signal that includes a plurality of copies of paging information, with the paging information duplicated in the frequency domain, e.g., as discussed above with regard to FIG. 5A. Specifically, FIG. 9 illustrates an example in which each copy of the paging information (e.g., PDCCH and/or PDSCH) may be included in a respective paging block, wherein each paging block is "self-decodable," meaning that a wireless device, such as the UE 106/107, may decode a single received paging block without reference to any portion of any other paging block. For example, if a paging block is self-decodable, the information in that paging block is not interleaved with information contained in other paging blocks. In other implementations, only a subset of the paging blocks (e.g., one paging block) may be self-decodable. As illustrated in FIG. 9, the paging blocks of the paging signal may be transmitted at the same time (i.e., at the same point in the time domain), but may be arranged in the frequency domain, such that the paging blocks may be transmitted within non-overlapping (e.g., adjacent or proximate) frequency windows.

Because at least one paging block is self-decodable, a UE receiving the paging signal (or a portion thereof) may successfully decode the paging signal based on only a single paging block, as long as a self-decodable paging block is accurately received. However, the paging signal includes a plurality of paging blocks, each containing a copy of the paging information directed to the UE. This provides increased coverage, in case reception at the UE is impaired. In particular, the paging signal of FIG. 9 may offer an advantage of spreading the paging information over a large frequency range, which may allow improved reception if reception is poor across a portion of the frequency range.

However, receiving a plurality of paging blocks arranged in the frequency domain may require the UE to monitor a larger frequency range than would be required to receive only a single paging block. As noted with regard to FIG. 5A, increasing the frequency range monitored by the UE may increase power consumption.

Therefore, to reduce power consumption, the UE may determine an appropriate number of paging blocks to receive, e.g., based on coverage quality at the UE, and may monitor a corresponding portion of the frequency range containing the paging signal. For example, the UE may determine whether a quality level of the signal coverage of one or more wireless communication signals received from the base station meets a predetermined threshold, e.g., according to any of the methods discussed above with regard to FIG. 6. In response to determining that the coverage quality meets the threshold, the UE may monitor a first frequency range to receive a first subset of the paging blocks (e.g., a single paging block). Specifically, the UE may configure a receiver appropriately to monitor the first frequency range. Such configuration may include setting a sample rate; powering certain amplifiers, buffers, or other circuitry; and/or other steps.

In response to determining that the coverage quality does not meet the threshold, the UE may monitor a second frequency range, larger than the first frequency range, to receive a larger set of the paging blocks (e.g., all of the paging blocks). The UE may configure the receiver appropriately to monitor the second frequency range. In some scenarios, the second frequency range may include the first frequency range, such that the larger set of the paging blocks may include the first subset of the paging blocks.

In some scenarios, the UE may further determine one or more additional thresholds, to more finely determine an appropriate number of paging blocks to monitor for. For example, the UE may determine whether the coverage quality meets a second threshold that is lower than the first threshold discussed above. If the coverage quality does not meet the second threshold, then the UE may monitor a third frequency range, larger than the second frequency range, to receive a set of paging blocks that is even larger than the set included in the second frequency range. The UE may configure the receiver appropriately to monitor the third frequency range.

In some scenarios, rather that utilizing predetermined thresholds, the UE may dynamically estimate an appropriate number of paging blocks to receive, e.g., based on measured or expected coverage quality or reception performance at the UE, and may monitor a corresponding portion of the frequency range containing the paging signal.

The paging signal format illustrated in FIG. 9 may offer certain advantages and disadvantages relative to the scenarios of FIG. 6 and FIG. 7. For example, in the scenario of FIG. 9, the base station may transmit only a single paging signal, without the duplication involved in the procedure of FIG. 6. Additionally, the extra signaling of FIG. 7 is unnecessary. However, in the signal format illustrated in FIG. 9, each paging block is self-decodable. This may be disadvantageous, in that it does not allow frequency-interleaving of the paging information across the full frequency range of the paging signal. Spreading each repetition of the paging information over a large frequency range may allow improved reception, e.g., if reception is poor across a portion of the frequency range. Therefore, in other implementations, only a subset of the paging blocks (e.g., one paging block) may be self-decodable, while other paging blocks may depend upon the subset of paging blocks for decoding. For example, the other paging blocks may be complement blocks to enhance the subset of paging blocks. This may allow, e.g., frequency-interleaving between the other paging blocks.

Figure 10:
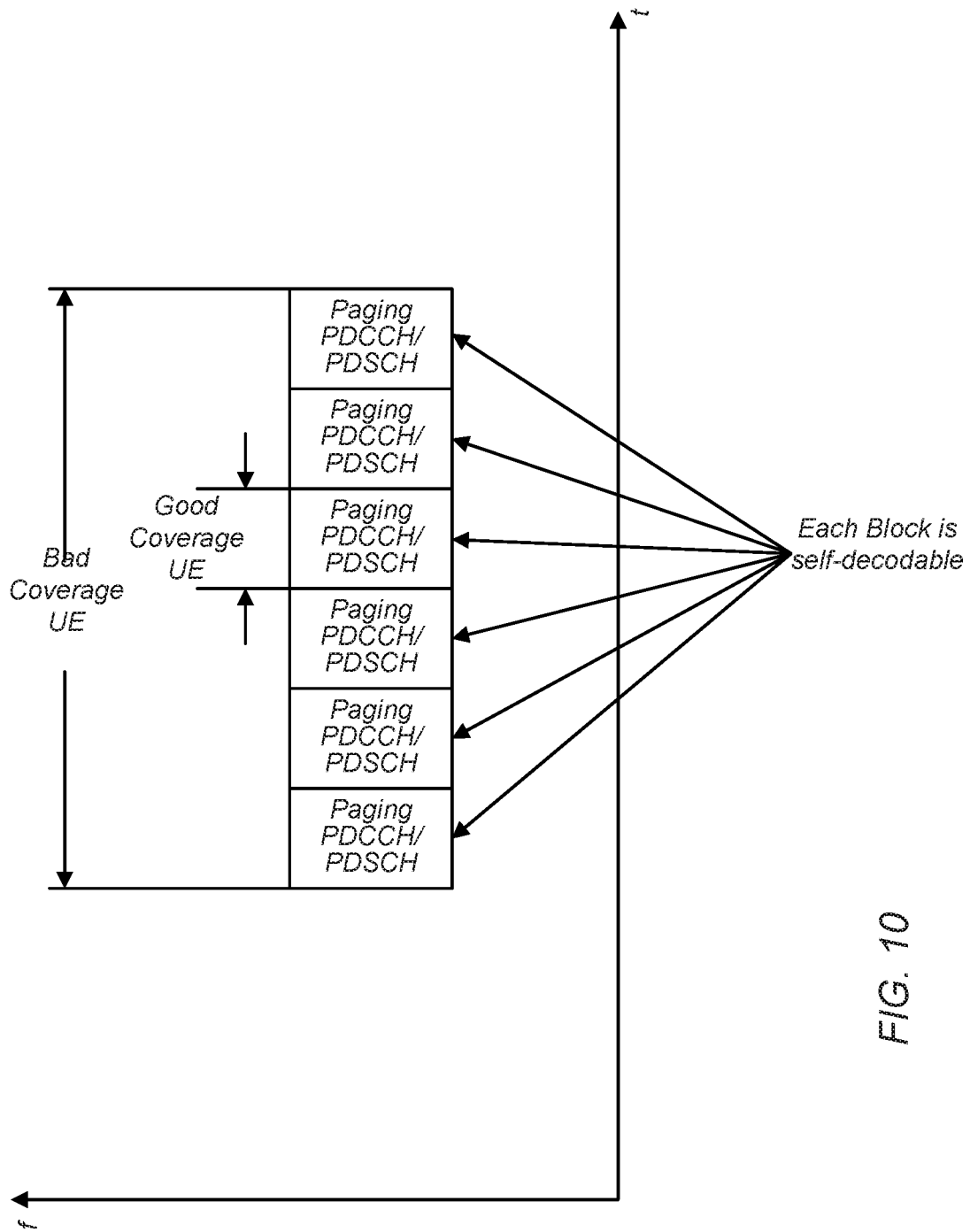
FIG. 10 illustrates an example paging signal for use in selectively increasing signal coverage for a wireless device by selectively receiving a determined number of paging blocks arranged in the time domain, according to some embodiments.

FIG. 10—Selectively Receiving a Determined Number of Paging Blocks in the Time Domain FIG. 10 illustrates an example paging signal for use in selectively increasing signal coverage for a wireless device by selectively receiving a determined number of paging blocks arranged in the time domain, according to some embodiments. The paging signal of FIG. 9 may be transmitted by a base station such as the base station 102.

Specifically, FIG. 10 illustrates a paging signal that includes a plurality of copies of paging information, with the paging information duplicated in the time domain, e.g., as discussed above with regard to FIG. 5B. Specifically, FIG. 10 illustrates an example in which each copy of the paging information (e.g., PDCCH and/or PDSCH) may be included in a respective paging block, wherein each paging block is self-decodable, as in the example of FIG. 9. In other implementations, only a subset of the paging blocks (e.g., one paging block) may be self-decodable. As illustrated in FIG. 10, the paging blocks of the paging signal may be transmitted at the same frequency (i.e., at the same point in the frequency domain), but may be arranged in the time domain, such that the paging blocks may be transmitted within non-overlapping (e.g., adjacent or proximate) time windows. In other scenarios, the paging blocks may not all be located at the same frequency, but may utilize frequency hopping, e.g., as discussed above with regard to FIG. 5D, to provide frequency diversity.

Because at least one paging block is self-decodable, a UE receiving the paging signal (or a portion thereof) may successfully decode the paging signal based on only a single paging block, as long as a self-decodable paging block is accurately received. However, the paging signal includes a plurality of paging blocks, each containing a copy of the paging information directed to the UE. This provides increased coverage, in case reception at the UE is impaired. In particular, the paging signal of FIG. 10 may offer an advantage of spreading the paging information over a large time range, which may allow improved reception if reception is poor across a portion of the time range.

However, receiving a plurality of paging blocks arranged in the time domain may require the UE to receive for a longer time than would be required to receive only a single paging block. As noted with regard to FIG. 5B, increasing the reception time may increase power consumption.

Therefore, to reduce power consumption, the UE may determine an appropriate number of paging blocks to receive, e.g., based on coverage quality at the UE, and may monitor a corresponding portion of the time range containing the paging signal. For example, the UE may determine whether a quality level of the signal coverage of one or more wireless communication signals received from the base station meets a predetermined threshold, e.g., according to any of the methods discussed above with regard to FIG. 6. In response to determining that the coverage quality meets the threshold, the UE may monitor the frequency range of the paging signal during a first period of time to receive a first subset of the paging blocks (e.g., a single paging block). For example, the UE may cause a receiver to receive, buffer, and/or process only the portions of the paging signal receivable during the first period of time. In some scenarios, the receiver may enter a low-power, non-receiving state following the first period of time.

In response to determining that the coverage quality does not meet the threshold, the UE may monitor the frequency range of the paging signal during a second period of time, larger than the first period of time, to receive a larger set of the paging blocks (e.g., all of the paging blocks). For example, the UE may cause the receiver to receive, buffer, and/or process only the portions of the paging signal receivable during the second period of time. In some scenarios, the second period of time may include the first period of time, such that the larger set of the paging blocks may include the first subset of the paging blocks.

In some scenarios, the UE may further determine one or more additional thresholds, to more finely determine an appropriate number of paging blocks to monitor for. For example, the UE may determine whether the coverage quality meets a second threshold that is lower than the first threshold discussed above. If the coverage quality does not meet the second threshold, then the UE may monitor the frequency range of the paging signal during a third period of time, larger than the second period of time, to receive a set of paging blocks that is even larger than the set included in the second frequency range.

In some scenarios, rather that utilizing predetermined thresholds, the UE may dynamically estimate an appropriate number of paging blocks to receive, e.g., based on measured or expected coverage quality or reception performance at the UE, and may monitor a corresponding portion of the frequency range containing the paging signal.

Similar to the paging signal format illustrated in FIG. 9, the paging signal format illustrated in FIG. 10 may transmit only a single paging signal, without the duplication involved in the procedure of FIG. 6, while also avoiding the extra signaling of FIG. 7. However, in the signal format illustrated in FIG. 10, each paging block is self-decodable, which may prevent time-interleaving of the paging information. Therefore, in other implementations, only a subset of the paging blocks (e.g., one paging block) may be self-decodable, while other paging blocks may depend upon the subset of paging blocks for decoding. For example, the other paging blocks may be complement blocks to enhance the subset of paging blocks. This may allow, e.g., time-interleaving between the other paging blocks.

Figure 11:
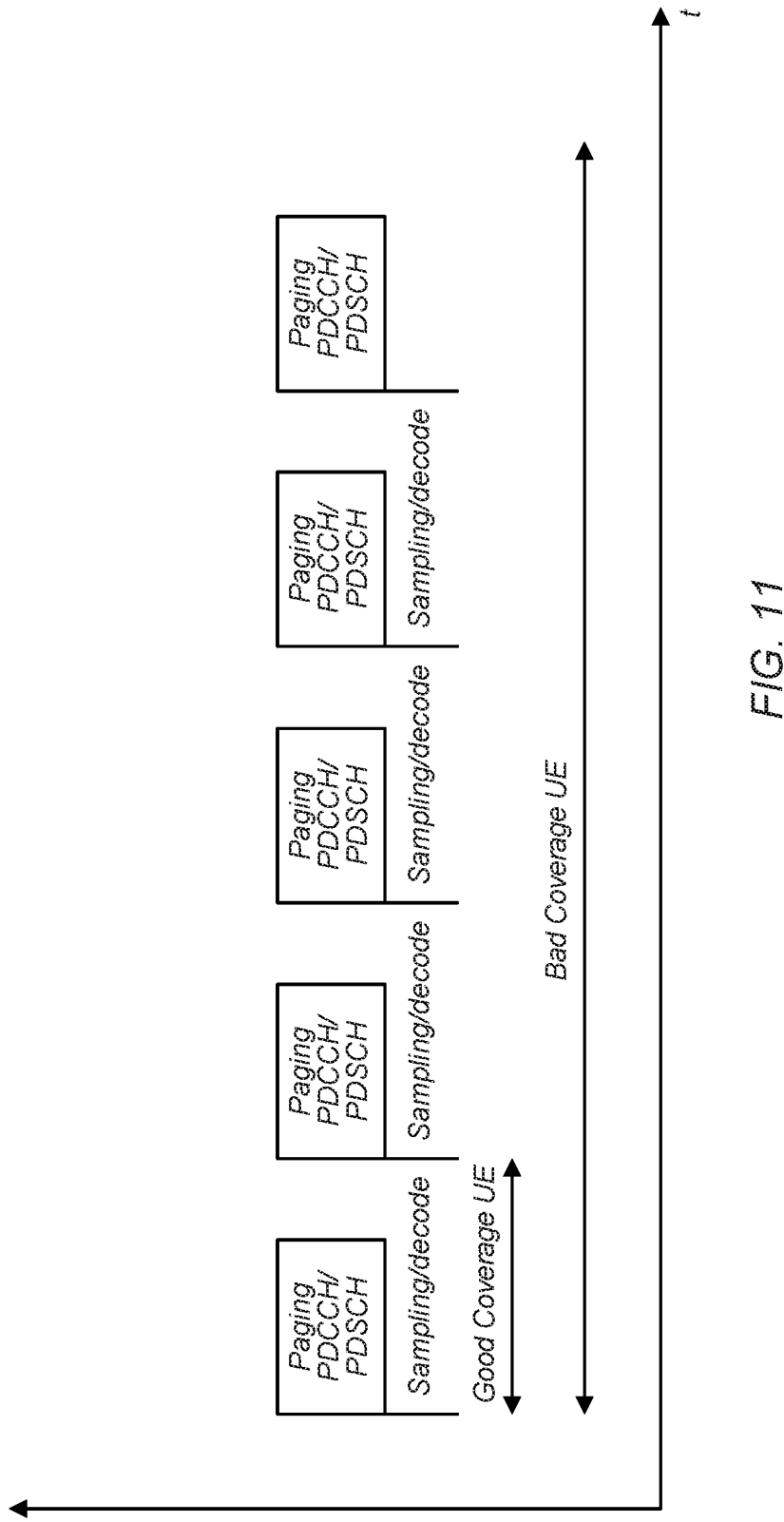
FIG. 11 illustrates an example paging signal for use in selectively increasing signal coverage for a wireless device by selectively receiving a dynamic number of paging blocks arranged in the time domain, according to some embodiments.

FIG. 11—Selectively Receiving a Dynamic Number of Paging Blocks in the Time Domain An additional tradeoff of the paging signal formats illustrated in FIG. 9 and FIG. 10 is that the UE must effectively estimate the appropriate number of paging blocks to receive, e.g., based on measured or expected coverage quality. In order to avoid reception failure, the UE may, in some scenarios, intentionally overestimate the appropriate number of paging blocks to receive, to provide a margin of error. This may lead to inefficiency. Additionally, even with such overestimation, there may be instances in which the estimated number of paging blocks proves insufficient to decode the paging information, e.g., due to a spike in interference. Such instances may result in reception failure.

When the paging blocks are arranged in the time domain, e.g., as illustrated in FIG. 10, another option is available. Specifically, the UE may dynamically determine an appropriate number of paging blocks to receive by receiving and attempting to decode each paging block in time sequence, until decoding is successful. Each paging block received provides an additional redundant copy of the paging information, improving the UE's ability to decode the paging information. Thus, once the UE has received enough paging blocks to allow successful decoding, the UE may forego receiving additional paging blocks, e.g., by placing the receiver into a low-power state. In this scenario, the UE need not estimate in advance an appropriate number of paging blocks to receive.

However, processing and attempting to decode a received paging block may take a substantial amount of time. Therefore, if the UE is able to successfully decode the first received paging block, the UE may be unable to determine that decoding is successful until after the UE has received and begun to process one or more additional paging blocks. Thus, power may be wasted through unnecessary reception.

FIG. 11 presents an example paging signal configured to alleviate this inefficiency. Specifically, FIG. 11 illustrates an example paging signal for use in selectively increasing signal coverage for a wireless device by selectively receiving a dynamic number of paging blocks arranged in the time domain, according to some embodiments. The paging signal of FIG. 9 may be transmitted by a base station such as the base station 102.

As illustrated in FIG. 11, the paging signal may include a plurality of copies of paging information, with the paging information duplicated in the time domain, e.g., much as discussed above with regard to FIG. 10. Specifically, FIG. 11 illustrates an example in which each copy of the paging information (e.g., PDCCH and/or PDSCH) may be included in a respective paging block, wherein each paging block is self-decodable. In other implementations, only a subset of the paging blocks (e.g., one paging block) may be self-decodable. As illustrated in FIG. 11, the paging blocks of the paging signal may be transmitted at the same frequency (i.e., at the same point in the frequency domain), but may be arranged in the time domain, such that the paging blocks may be transmitted within non-overlapping time windows. However, in contrast to the paging signal illustrated in FIG. 10, the paging blocks of the paging signal illustrated in FIG. 11 may be separated from the preceding paging block by a time gap. Specifically, the time gap may be sufficient to allow the UE to attempt to decode at least a portion (e.g., PDCCH and/or PDSCH) of the preceding paging block, and to determine whether the attempt was successful.

The UE may receive a first paging block within the frequency range of the paging signal, and may attempt to decode at least a portion of the paging information based on the first paging block. This decoding attempt may occur during the time gap following the first paging block. The UE may forego receiving during the time gap, e.g., by placing the receiver in a low-power state.

In response to determining that the attempt to decode the at least a portion of the paging information was successful, the UE may forego receiving subsequent paging blocks, e.g., by allowing the receiver to remain in the low-power state, and may take any appropriate action based on the paging information.

In response to determining that the attempt to decode the at least a portion of the paging information was not successful, the UE may activate the receiver and receive a second paging block. The UE may then again attempt to decode at least a portion of the paging information, this time based on the first and second paging blocks.

Decoding may be attempted after reception of each paging block, until successful, or until the last paging block has been received. Once decoding is successful, the UE may forego receiving subsequent paging blocks, e.g., by allowing the receiver to remain in the low-power state, and may take any appropriate action based on the paging information.

Figure 12:
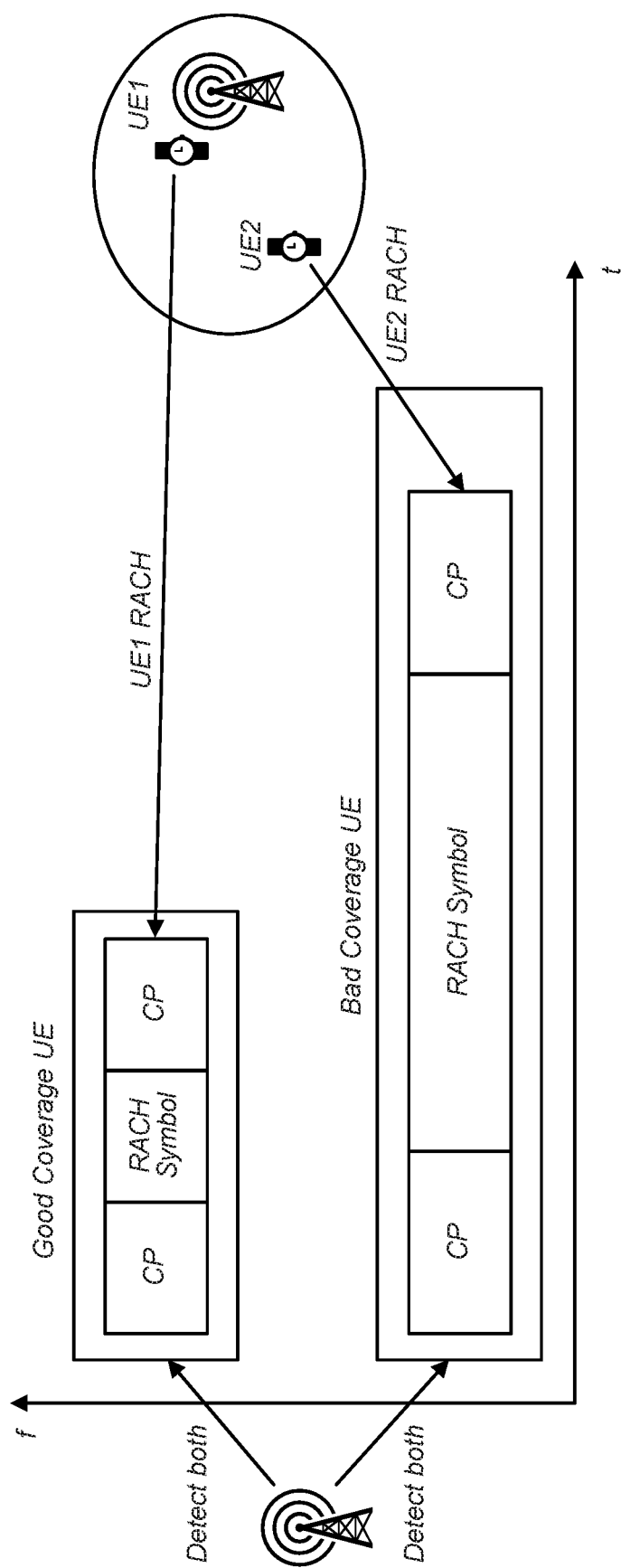
FIG. 12 illustrates an example procedure for selectively increasing signal coverage for a wireless device, by selectively transmitting a preferred RACH signal, according to some embodiments.

FIG. 12—Selectively Monitoring for a Preferred Paging Signal

Similar principles may be applied when a wireless communication device, such as a link budget limited device, initiates a mobile originated (MO) call. For example, in various 3GPP standards, a wireless communication device may transmit a random access channel (RACH) packet. The RACH packet may include a cyclic prefix (CP) to align the timing of asynchronous UEs, one or more RACH symbols, and a guard period (GP) to protect the next UL transmission.

The coverage (e.g., power level) of the RACH transmission may be increased by at least two different methods. In the first method, a longer RACH symbol may be increased in length by using a lower sub-carrier spacing (SCS). However, lower SCS makes the signal more susceptible to frequency errors, such as may result from doppler shift, if the wireless communication device is moving at high speed. In the second method, a shorter RACH symbol, having a higher SCS, may be repeated. However, higher SCS makes the signal more susceptible to timing errors. Either method may be used to increase the length of the RACH signal.

Increasing the length of the RACH signal may involve tradeoffs similar to those discussed above with regard to paging signals. Specifically, a longer signal may provide improved coverage, but at the cost of additional power consumption at the UE. Thus, a desirable approach may include selectively increasing signal coverage, e.g., only when additional coverage is needed, while maintaining a lower level of signal coverage, to reduce power consumption, when the lower level of signal coverage is sufficient.

FIG. 12 illustrates an example procedure for selectively increasing signal coverage for a wireless device, by selectively transmitting a preferred RACH signal, according to some embodiments. As illustrated in FIG. 12, a wireless device, such as the UE 106/107, may be located at any of various coverage areas within a cell. For example, UE1 is illustrated as being located close to the base station, which should result in good coverage (e.g., high signal strength, high signal-to-noise ratio, etc.), while UE2 is illustrated as being located close to the cell edge, which may result in poor coverage (e.g., low signal strength, low signal-to-noise ratio, etc.). Specifically, a RACH signal transmitted by UE1 may be received clearly, while the base station may experience greater signal loss during reception of a signal transmitted by UE2. As a result, UE1 may be capable of transmitting RACH signals with less repetition than UE2.

To accommodate both UE1 and UE2, the base station may monitor two distinct frequency ranges for receiving RACH signals. For example, the first frequency range may be designated for a UE to transmit a short RACH signal, while the second frequency range may be designated for the UE to transmit a long RACH signal. The short RACH signal may include one copy of a short RACH symbol, while the long RACH signal may include a longer RACH symbol or multiple repetitions of the short RACH symbol. The base station may monitor both frequency ranges, so as to receive either the long paging signal or the short paging signal, e.g., without foreknowledge of which version the UE will transmit.

As illustrated in FIG. 12, a UE experiencing good coverage, such as UE1, may transmit a short RACH signal on the first frequency range, while a UE experiencing poor coverage, such as UE2, may transmit a long RACH signal on the second frequency range. Because the second RACH signal includes more transmit power, a UE experiencing poor coverage may increase the probability of successfully transmitting the RACH signal by choosing to transmit the longer RACH signal, which may lead to increased efficiency and performance. However, because the shorter RACH signal is much shorter in time than the longer RACH signal, a UE experiencing good coverage may conserve power by choosing to transmit the shorter RACH signal, as the increased coverage of the longer RACH signal may not be necessary.

A UE may use any of various methods to determine which paging signal to receive. For example, the UE may determine whether a quality level of the signal coverage of one or more wireless communication signals transmitted to or received from the base station meets a predetermined threshold. As another example, the UE may determine whether recent transmission performance meets a predetermined threshold. In response to determining that the threshold is met, the UE may transmit the short RACH signal on the first frequency range. In response to determining that the threshold is not met, the UE may transmit the longer RACH signal on the second frequency range.

FIG. 13—Selectively Transmitting a Determined Number of RACH Symbols

FIG. 13 illustrates an example RACH signal for use in selectively increasing signal coverage for a wireless device by selectively transmitting a determined number of RACH symbols within the signal, according to some embodiments. The RACH signal of FIG. 13 may be transmitted by a wireless communication device, such as the UE 106/107, and may be received by a base station such as the base station 102.

Specifically, FIG. 13 illustrates a RACH signal that includes a plurality of copies of a RACH symbol. Each RACH symbol is self-detectable, so the base station receiving the RACH signal (or a portion thereof) may successfully detect the RACH signal based on only a single RACH symbol, as long as the RACH symbol is accurately received. However, the RACH signal includes a plurality of RACH symbols (e.g., a plurality of copies of a RACH symbol), to provide increased coverage, in case reception at the base station is impaired. However, transmitting a plurality of RACH symbols consumes more power than would be required to transmit only a single RACH symbol.

Therefore, to reduce power consumption, the UE may determine an appropriate number of RACH symbols to transmit, e.g., based on coverage quality at the UE, and may transmit only that number of RACH symbols. For example, the UE may determine whether a quality level of the signal coverage of one or more wireless communication signals transmitted to or received from the base station meets a predetermined threshold, e.g., according to any of the methods discussed above with regard to FIG. 6. In response to determining that the coverage quality meets the threshold, the UE may transmit a first number of RACH symbols (e.g., a single RACH symbol). In response to determining that the coverage quality does not meet the threshold, the UE may transmit a second, larger number of RACH symbols (e.g., all of the RACH symbols of the RACH signal).

In some scenarios, the UE may further determine one or more additional thresholds, to more finely determine an appropriate number of RACH symbols to transmit. For example, the UE may determine whether the coverage quality meets a second threshold that is lower than the first threshold discussed above. If the coverage quality does not meet the second threshold, then the UE may transmit a third number of RACH symbols, larger than the second number of RACH symbols.

In some scenarios, rather that utilizing predetermined thresholds, the UE may dynamically estimate an appropriate number of RACH symbols to transmit, e.g., based on measured or expected coverage quality or transmission performance at the UE, and may transmit a corresponding number of RACH symbols.

Example Implementations

In some scenarios, coverage extension may be accomplished according to any of the following examples.

A wireless communication device may include a wireless communication receiver, a memory storing software instructions; and a processor configured to implement the software instructions. Implementing the software instructions may cause the wireless communication device to determine whether coverage quality of wireless communication signals received by the receiver meets a predetermined threshold. In response to determining that the coverage quality meets the threshold, the software instructions may cause the wireless communication device to configure the receiver to monitor a first frequency range to receive only a first paging block within the first frequency range, wherein the first paging block is self-decodable. In response to determining that the coverage quality does not meet the threshold, the software instructions may cause the wireless communication device to configure the receiver to monitor a second, larger frequency range to receive a plurality of paging blocks arranged in the frequency domain within the second frequency range, the plurality of paging blocks including the first paging block, wherein each paging block includes paging information directed to the wireless communication device.

In some scenarios, the plurality of paging blocks may be a first plurality of paging blocks, wherein implementing the software instructions may further cause the wireless communication device to determine whether the coverage quality of the wireless communication signals meets a second, lower predetermined threshold. In response to determining that the coverage quality does not meet the second threshold, the software instructions may cause the wireless communication device to configure the receiver to monitor a third frequency range, larger than the second frequency range, to receive a second plurality of paging blocks, in addition to the first plurality of paging blocks, the first and second pluralities of paging blocks being arranged in the frequency domain within the third frequency range.

A wireless communication device may include a wireless communication receiver, a memory storing software instructions, and a processor configured to implement the software instructions. Implementing the software instructions may cause the wireless communication device to determine whether coverage quality of wireless communication signals received by the receiver meets a predetermined threshold. In response to determining that the coverage quality meets the threshold, the software instructions may cause the wireless communication device to configure the receiver to monitor a frequency range for a first period of time to receive only one paging block within the frequency range, wherein the one paging block is self-decodable. In response to determining that the coverage quality does not meet the threshold, the software instructions may cause the wireless communication device to configure the receiver to monitor the frequency range for a second, longer period of time to receive a plurality of paging blocks arranged in the time domain within the second period of time, the plurality of paging blocks including the first paging block, wherein each paging block includes paging information directed to the wireless communication device.

In some scenarios, the plurality of paging blocks may be a first plurality of paging blocks, wherein implementing the software instructions may further cause the wireless communication device to determine whether the coverage quality of the wireless communication signals meets a second, lower predetermined threshold. In response to determining that the coverage quality does not meet the second threshold, configure the receiver to monitor the frequency range for a third period of time, larger than the period of time, to receive a second plurality of paging blocks, in addition to the first plurality of paging blocks, the first and second pluralities of paging blocks being arranged in the time domain within the third period of time.

A wireless communication device may include a wireless communication receiver; a memory storing software instructions; and a processor configured to implement the software instructions. Implementing the software instructions may cause the wireless communication device to receive, via the receiver, a first paging block of a paging signal within a frequency range; attempt to decode at least a portion of the first paging block, wherein the first paging block is self-decodable; and determine whether the attempt to decode the at least a portion of the first paging block was successful. In response to determining that the attempt to decode the at least a portion of the first paging block was not successful, the software instructions may cause the wireless communication device to receive a second paging block of the paging signal within the frequency range, wherein the second paging block is separated from the first paging block by a time gap of sufficient length to allow the wireless communication device to perform the attempting and determining prior to receiving the second paging block. In response to determining that the attempt to decode the at least a portion of the first paging block was successful, the software instructions may cause the wireless communication device to forego receiving subsequent paging blocks of the paging signal.

In some scenarios, the wireless communication device may be, or include, a link budget limited device.

A wireless communication device may include a wireless communication transmitter; a memory storing software instructions; and a processor configured to implement the software instructions. Implementing the software instructions may cause the wireless communication device to determine whether coverage quality of wireless communication signals received by the receiver meets a predetermined threshold. In response to determining that the coverage quality meets the threshold, the software instructions may cause the wireless communication device to cause the transmitter to operate in a frequency range for a first period of time to transmit only one copy of a RACH symbol within the frequency range. In response to determining that the coverage quality does not meet the threshold, the software instructions may cause the wireless communication device to configure the transmitter to operate in the frequency range for a second, longer period of time to transmit a plurality of copies of the RACH symbol arranged in the time domain within the second period of time, the plurality of copies of the RACH symbol including the first copy of the RACH symbol, wherein each copy of the RACH symbol is self-detectable.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device comprising:
a wireless communication receiver;
a memory storing software instructions; and
a processor coupled to the wireless communication receiver and the memory, the processor configured to implement the software instructions, wherein implementing the software instructions causes the wireless communication device to:
determine whether a reception performance metric meets a predetermined threshold;
in response to determining that the reception performance metric meets the threshold, monitor a first frequency range to receive a first paging signal including a single copy of paging information; and
in response to determining that the reception performance metric does not meet the threshold, monitor a second, non-overlapping frequency range to receive a second paging signal including a plurality of copies of the paging information.

2. The wireless communication device of claim 1, wherein both the first paging signal and the second paging signal include paging information directed to the wireless communication device.

3. The wireless communication device of claim 1, wherein implementing the software instructions further causes the wireless communication device to:
transmit to a base station an indication of whether the wireless communication device will monitor the first frequency range or the second frequency range;
wherein, based on the indication, only one of the first paging signal or the second paging signal includes paging information directed to the wireless communication device.

4. The wireless communication device of claim 3, wherein implementing the software instructions further causes the wireless communication device to:
after transmitting the indication, determine a change in the reception performance metric; and
in response to determining the change in the reception performance metric, transmit to the base station an updated indication of whether the wireless communication device will monitor the first frequency range or the second frequency range.

5. The wireless communication device of claim 1, wherein the plurality of copies of the paging information in the second paging signal are arranged in the time domain, wherein the first frequency range and the second frequency range have substantially the same bandwidth.

6. The wireless communication device of claim 1, wherein the plurality of copies of the paging information in the second paging signal are interleaved.

7. The wireless communication device of claim 1, wherein the reception performance metric includes a coverage quality metric of wireless communication signals received by the wireless communication receiver.

8. The wireless communication device of claim 7, wherein the coverage quality metric includes a reference signal receive power (RSRP) value.

9. The wireless communication device of claim 1, wherein the wireless communication device is a link budget limited device.

10. An apparatus for use in a wireless communication device comprising, the apparatus comprising:
a memory storing software instructions; and
a processor configured to implement the software instructions, wherein implementing the software instructions causes the processor to:
determine whether a reception performance metric meets a predetermined threshold;
in response to determining that the reception performance metric meets the threshold, configure a receiver of the wireless communication device to monitor a first frequency range to receive a first paging signal including a single copy of paging information; and
in response to determining that the reception performance metric does not meet the threshold, configure the receiver to monitor a second frequency range to receive a second paging signal including a plurality of copies of the paging information.

11. The apparatus of claim 10, wherein both the first paging signal and the second paging signal include paging information directed to the wireless communication device.

12. The apparatus of claim 10, wherein implementing the software instructions further causes the processor to:

cause a transmitter of the wireless communication device to transmit to a base station an indication of whether the wireless communication device will monitor the first frequency range or the second frequency range;

wherein, based on the indication, only one of the first paging signal or the second paging signal includes paging information directed to the wireless communication device.

13. The apparatus of claim 12, wherein implementing the software instructions further causes the processor to:

after causing the transmitter to transmit the indication, determine a change in the reception performance metric; and in response to determining the change in the reception performance metric, cause the transmitter to transmit to the base station an updated indication of whether the wireless communication device will monitor the first frequency range or the second frequency range.

14. The apparatus of claim 10, wherein the plurality of copies of the paging information in the second paging signal are arranged in the time domain, wherein the first frequency range and the second frequency range have substantially the same bandwidth.

15. The apparatus of claim 10, wherein the second frequency range includes the first frequency range.

16. The apparatus of claim 15, wherein each copy of the paging information included in the second paging signal is included in a respective self-decodable block.

17. The apparatus of claim 10, wherein the reception performance metric includes a coverage quality metric of wireless communication signals received by the wireless communication receiver.

18. The apparatus of claim 17, wherein the coverage quality metric includes a reference signal receive power (RSRP) value.

19. A non-transitory memory medium storing software instructions executable by processor circuitry of a wireless communication device, wherein executing the software instructions causes the wireless communication device to:

determine whether a reception performance metric meets a predetermined threshold;

in response to determining that the reception performance metric meets the threshold, monitor a first frequency range to receive a first paging signal including a single copy of paging information; and in response to determining that the reception performance metric does not meet the threshold, monitor a second, non-overlapping frequency range to receive a second paging signal including a plurality of copies of the paging information.

20. The non-transitory memory medium of claim 19, wherein executing the software instructions further causes the wireless communication device to:

transmit to a base station an indication of whether the wireless communication device will monitor the first frequency range or the second frequency range;

wherein, based on the indication, only one of the first paging signal or the second paging signal includes paging information directed to the wireless communication device.

\* \* \* \* \*